(12) United States Patent
Mahnad

(10) Patent No.: US 9,142,236 B1
(45) Date of Patent: Sep. 22, 2015

(54) H-BRIDGE POWER AMPLIFIER FOR OPTICAL RECORDING HEAD ACTUATOR

(71) Applicant: Oracle International Corporation, Redwood City, CA (US)

(72) Inventor: Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/501,753

(22) Filed: Sep. 30, 2014

(51) Int. Cl.
  *G11B 21/02* (2006.01)
  *G11B 5/60* (2006.01)
  *G11B 5/596* (2006.01)

(52) U.S. Cl.
  CPC .......... *G11B 5/6005* (2013.01); *G11B 5/59633* (2013.01)

(58) Field of Classification Search
  None
  See application file for complete search history.

(56) References Cited

U.S. PATENT DOCUMENTS

| 5,818,178 | A | * | 10/1998 | Marumoto et al. | 318/400.32 |
| 5,838,515 | A | * | 11/1998 | Mortazavi et al. | 360/78.12 |
| 5,982,571 | A | * | 11/1999 | Calfee et al. | 360/70 |
| 6,850,383 | B1 | * | 2/2005 | Bennett | 360/75 |
| 7,126,781 | B1 | * | 10/2006 | Bennett | 360/75 |
| 8,593,921 | B1 | | 11/2013 | Mahnad | |
| 2011/0288662 | A1 | * | 11/2011 | Carter et al. | 700/32 |
| 2014/0036649 | A1 | | 2/2014 | Mahnad | |

* cited by examiner

*Primary Examiner* — Tan X Dinh
(74) *Attorney, Agent, or Firm* — Brooks Kushman P.C.

(57) ABSTRACT

A recording head unit is described that can use a pulsed drive signal. The head unit can include a recording head to interact with a storage media, an actuator connected to the recording head and configured to move the recording head relative to the storage media, and control circuitry to send a control signal to the actuator, wherein the control circuitry includes a pulse driven switching circuitry to control current flow to the actuator. An H-bridge can be used to drive the actuator and move the read head.

18 Claims, 6 Drawing Sheets

| OUT$_1$ | OUT$_2$ | 311 | 314 | 312 | 313 | ACTUATOR MOTION |
|---|---|---|---|---|---|---|
| HIGH | LOW | CLOSED | CLOSED | OPEN | OPEN | PUSH |
| LOW | HIGH | OPEN | OPEN | CLOSED | CLOSED | PULL |
| LOW | LOW | OPEN | CLOSED | CLOSED | OPEN | IDLE |

H-BRIDGE POWER AMPLIFIER FOR OPTICAL RECORDING HEAD ACTUATOR

TECHNICAL FIELD

Various embodiments relate to structures and methods for recording heads for mass storage devices, and more particularly, to a power amplifier driver of optical recording heads.

BACKGROUND

Optical tape is a data storage medium. In certain examples, it can take the form of long narrow strips onto which patterns can be written and from which patterns can be read. Optical tape may facilitate higher data transfer rates, greater storage capacity, and reduced access times relative to magnetic tape. Moreover because optical tape is written and read using optical pick up units that do not touch the recording surface of the tape, it may be more durable than magnetic tape.

Power amplifiers have been for driving actuators of recording heads utilized in mass storage devices, such as magnetic disk and tape drives. The power amplifiers are part of servo subsystems to control the motion of the actuators that place the recording heads over the desired tracks on the recording media. Excessive power dissipation and large footprints (required area on circuit board) of these amplifier drivers however, make them quite unfeasible for newer generations of optical tape drive architecture. This is due to need for many optical pickup units, e.g., 24 and above, with multiple actuator. Thus the present inventor determined a need for a new pickup head structures and methods.

SUMMARY

A recording head unit can include a recording head to interact with a storage media, an actuator connected to the recording head and configured to move the recording head relative to the storage media, and control circuitry to send a control signal to the actuator, wherein the control circuitry includes a pulse driven H-bridge amplifier to control current flow to the actuator.

In an example, the control circuitry includes a first switch and a second switch connected in series to create a first node, a third switch and a fourth switch connected in series to create a second node. In an example, the actuator is electrically connected between the first and second nodes. In an example, the second switch is connected to ground, the fourth switch is connected to ground, and the first switch and the third switch are connected to a power source. In an example, the control circuitry further includes a pulsed control module to supply the control signal to the first, second, third and fourth switches with the first and fourth switches are conductive to send current to the actuator in a first direction to move the head in a first head direction and the third and second switches are conductive to send current to the actuator in a second direction to move the head in a second head direction. In an example, the first switch, the second switch, the third switch and the fourth switch all operate in class D mode to minimize power loss. In an example, the first switch, the second switch, the third switch and the fourth switch are MOSFETS.

In an example, the control circuitry controls outputs a pulsed signal with variable frequency and variable pulse width to the actuator.

In an example, the control circuitry includes a feedback loop to the input of the controller signal. In an example, the control circuitry includes a sense resistor that provides first sense signal to an amplifier, the amplifier outputs a second sense signal to a summing circuit that sums the second sense signal and an input from a controller and outputs a signal to a forward compensation module outputs a signal to the pulse control module.

A recording head unit can include a recording head to interact with a storage media, an actuator connected to the recording head and configured to move the recording head relative to the storage media, and control circuitry to send a control signal to the actuator, wherein the control circuitry includes a pulse driven switching circuitry to control current flow to the actuator.

In an example, the control circuitry includes a first switch and a second switch connected in series to create a first node, a third switch and a fourth switch connected in series to create a second node, and wherein the actuator is electrically connected between the first and second nodes. In an example, the second switch is connected to ground, the fourth switch is connected to ground, and the first switch and the third switch are connected to a power source. In an example, the control circuitry further includes a pulsed control module to supply the control signal to the first, second, third and fourth switches with the first and fourth switches are conductive to send current to the actuator in a first direction to move the head in a first head direction and the third and second switches are conductive to send current to the actuator in a second direction to move the head in a second head direction.

In an example, the control circuitry includes a feedback loop to the input of the controller signal.

In an example, the control circuitry includes a sense resistor that provides first sense signal to an amplifier, the amplifier outputs a second sense signal to a summing circuit that sums the second sense signal and an input from a controller and outputs a signal to a forward compensation module outputs a signal to the pulse control module.

In an example, the first switch, the second switch, the third switch and the fourth switch are MOSFETS.

In an example, the control circuitry controls outputs a pulsed signal with variable frequency and variable pulse width to the actuator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
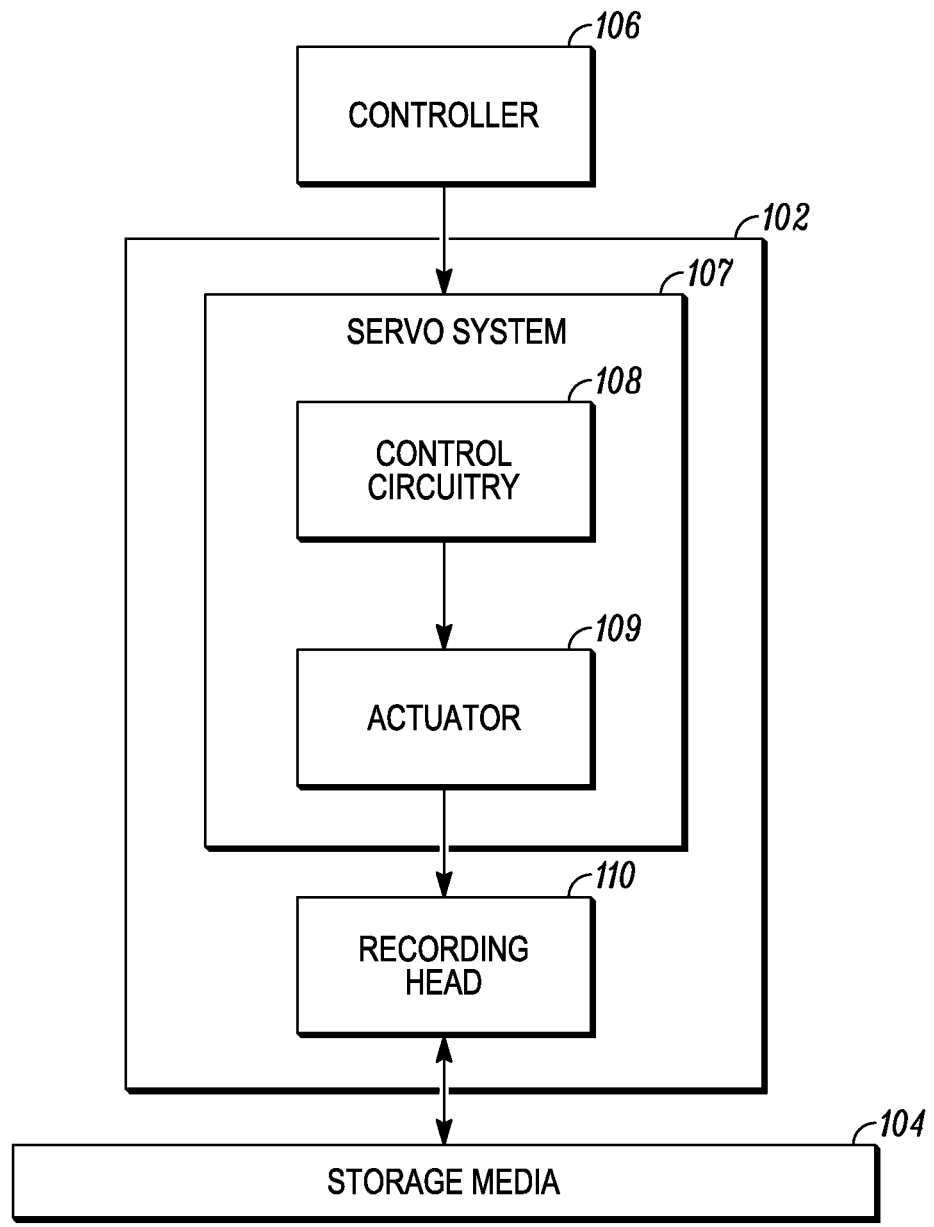
FIG. 1 shows a schematic diagram of a recording head unit according to an example.

FIG. 1 shows a schematic view of a recording head unit 102 for interacting with a mass storage media 104 to store data thereon upon receipt of instructions from a controller 106. The mass storage media 104 can be a tape, e.g., an optical tape or a magnetic tape or combinations thereof. The recording head unit 102 receives instructions from the controller 106. The recording head unit 102 is adapted to use a pulsed control signal to move the addressed location on the storage media.

The controller 106 can be a computer or a part of a computing machine that instructs the recording head unit 102 to move to certain tracks on the media 104 or to tracks within zones or segments on the media 104. The controller 106 also acts as an interface to other computing devices and/or circuitry, which can request data from the media or request data to be written and stored on the media. In an example, the recording head unit 102 includes a servo-system 107 to move a recording head 110 to its instructed location relative to the media 104. The recording head 110 can non-mechanically interact with the media 104 to read and write data bits to the media. The servo-system 107 includes control circuitry 108 that sends and receives electrical instructions, e.g., from controller 106 and instructs the actuator 109. The servo-system 107 uses a pulsed control signal to position the recording head 110. The actuator 109 moves the recording head 110 based on instructions from the control circuitry 108. In an example, the control circuitry receives instructions as to the location for the recording head 110 and power to move the recording head 110.

Figure 2:
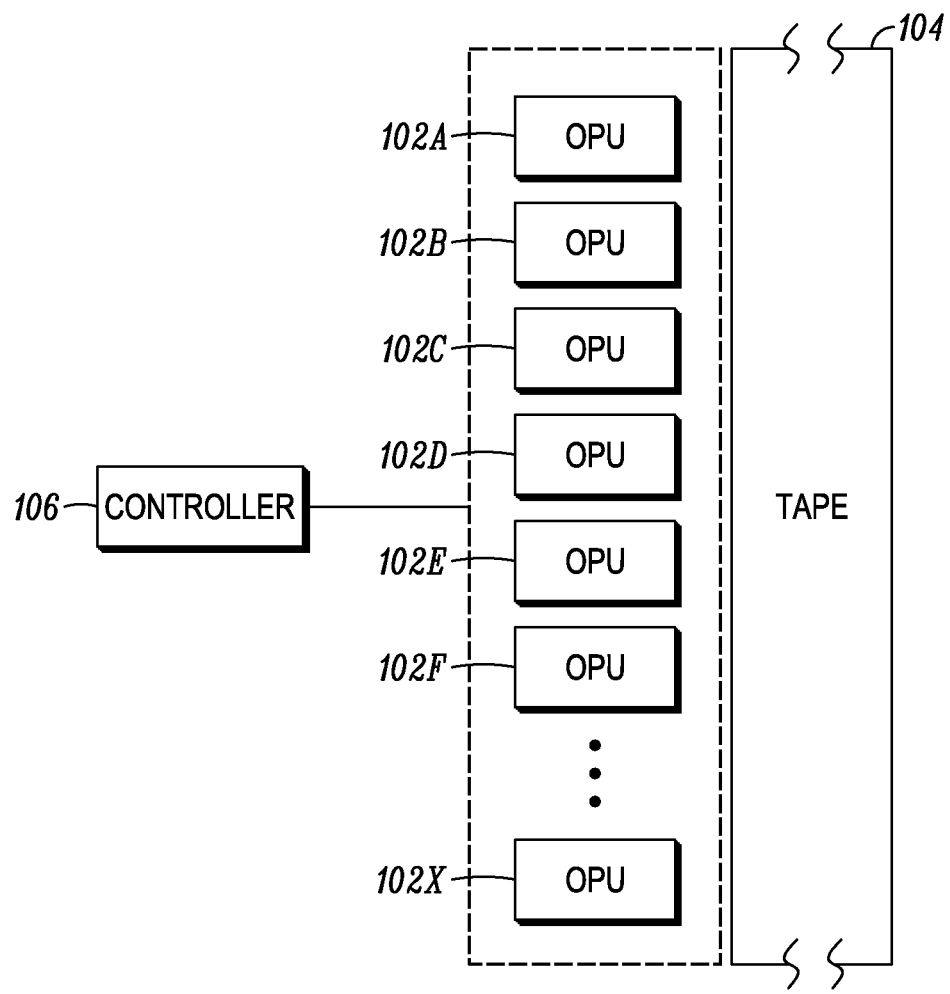
FIG. 2 shows a schematic diagram of portions of an optical tape system using a recording head unit according to an example.

FIG. 2 shows an data storage system and media as an optical tape drive system that may include, inter alia, a plurality of optical pickup units 102 (e.g., 102 a-102 x) and a controller 106. Each of the optical pickup units 102 may generate an optical beam that, when focused on a physical track of optical tape 104, writes data to or reads data from the physical track under the control of the controller 106 as the tape 104 moves past the pickup units 102. The optical tape 104 can store binary data on its physical tracks. Controller 106 includes circuitry to process instructions to issue operational signals to the optical pickup units and provide an interface to other circuitry (no shown). In the example of FIG. 2, the optical tape drive system includes twenty-four optical pickup units 112. The number of optical pickup units in other examples may of course be different. An alternative optical tape drive system, for example, may only include six, twelve or twenty four optical pickup units or other $2^N$ units.

An optical pickup unit 102 is set on supporting structure to allow movement to align with a track on the storage tape and is adapted to read or write data to its assigned track on the storage tape. The supporting structure can include the servo-system 102, which uses a pulsed control system to position the recording head 110 at the address associated with a location on the storage tape 104. The pickup units 102 are then laterally moveable within relative to a corresponding segment of the media 104 so that they can align with and read/write with a specified track within the media segment. Each optical pickup unit 102 is movable within a corresponding segment of the tape 104, for example, upon command by the controller 106. Each optical pickup unit 102 can then read data on the corresponding tape track. However, moving the optical pickup unit 102 consumes electrical energy and gives off heat within the system. In operation, instructions can direct electrical energy to each optical pickup unit 102 to cause the units to move laterally to align with a segment of the storage tape.

When reading or writing to the storage tape 104, the system using the optical pickup unit reads or writes data to a physical location that is identified by an address. This address identifies the physical location on the storage tape 104 and can be represented by an electrical signal from the controller 106 to the servo system. The optical pickup units 102 each include an actuator to convert and electrical signal into a mechanical, motive signal to move the head of the unit 102 to the addressed location on the storage media 104.

Figure 3:
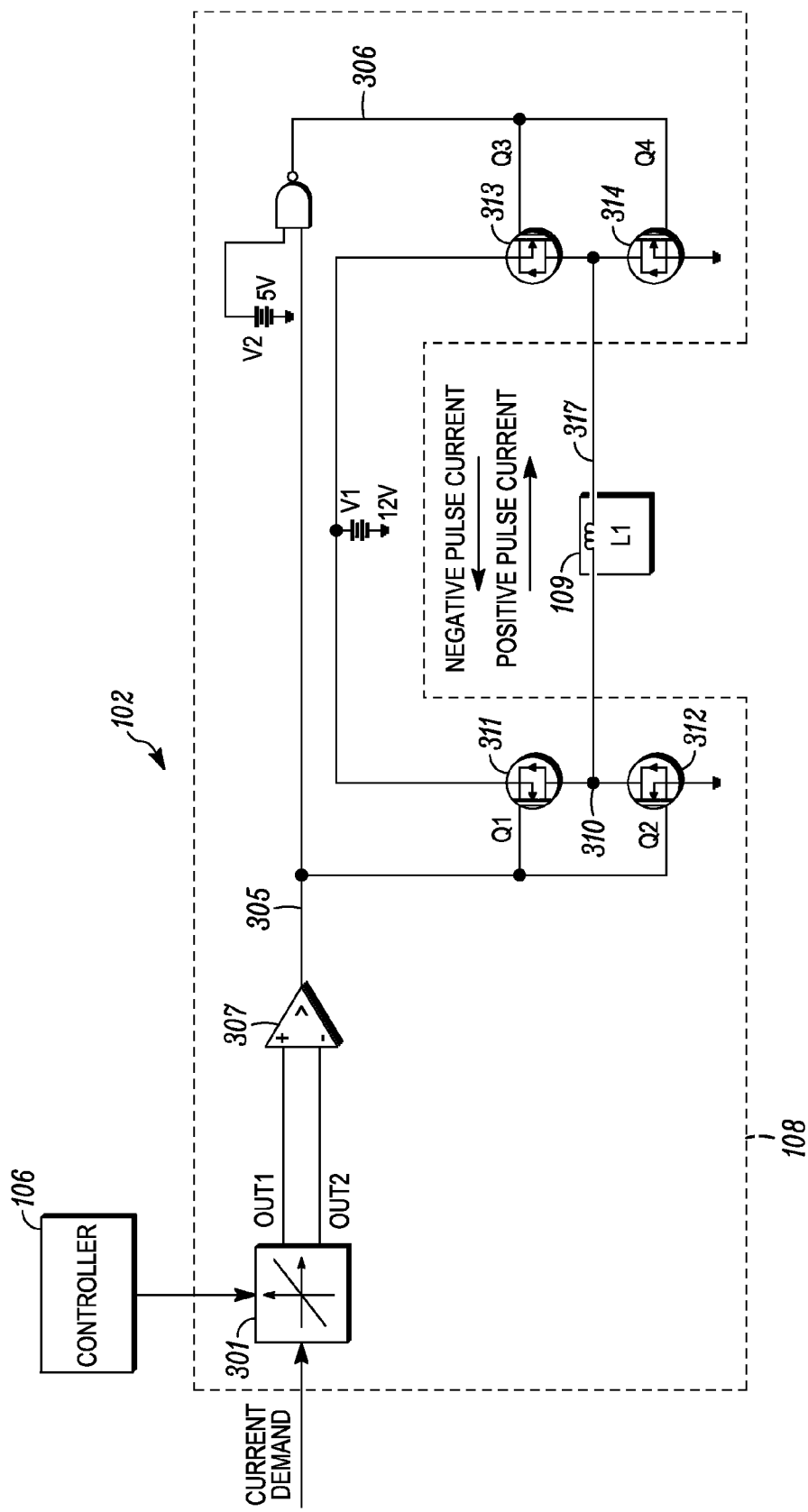
FIG. 3 shows circuit diagram of a portion of a recording head unit according to an example.

FIG. 3 shows a recording head unit 102 and a system for controlling the recoding head unit according to an example. The recording head unit 102 includes a pulse controller 301 that receives a control signal and outputs a pulsed signal to position the recording head 110. The pulse controller 301 can implement a transfer function that outputs a control signal that results in a pulsed signal to control the position of the recording head. An example of the pulse controller 301 is described in greater detail with regard to FIGS. 5 and 6. The pulse controller 301 can include circuitry or a processor to execute instructions, which can be machine readable and storable in memory, to affect the function(s) of the pulse controller 301. The pulse controller 301 outputs a control signal on line 305. The output can be the differential signal from a comparator 307 that receives a positive signal and a negative signal from the transfer function of the pulse controller 301. The comparator 307 can be a virtual comparator implemented in instructions that are executed by circuitry or a processor in the pulse controller 301. The virtual comparator 307 can provide a steady stepped signal using the difference between the positive signal and the negative signal from the transfer function. The control signal on line 305 is fed to control the bridge 310 that engages the actuator 109. The bridge 310 supplies a negative pulse current and a positive pulse current to power the actuator 109. With a more powerful signal in one direction, based on one of the negative signal or the positive signal, the actuator 109 will move the recording a greater distance in that direction. The bridge 310 can include switches 311, 312, 313, 314. The switches 311, 312 are connected in series and form a first leg of the bridge 310. The switches 313, 314 are connected in series and form a second leg of the bridge for an H-bridge topology. The first leg and the second leg can both be an integrated circuit, e.g., a complementary MOSFET half bridge, which can be a NDS885H from Fairchild Semiconductor of San Jose, Calif. The switch 311 can be a p-gate field effect transistor with its source connected to a voltage source, the gate connected to the input line 305 and the drain connected to a node 315. Node 315 is connected to an end of the actuator 109 and the drain of switch 312. The switch 312 can be an n-gate field effect transistor with its source connected to ground, the gate connected to the input line 305 and the drain connected to node 315. The switch 313 can be a p-gate field effect transistor with its source connected to a voltage source, the gate connected to an inverted input line 305 and the drain connected to a node 317. The switch 314 can be an n-gate field effect transistor with its source connected to ground, the gate connected to an inverted input line 305 and the drain connected to node 317. The node 317 is connected to a second end of the actuator 109. An inverter, here shown as a NAND gate, inverts the control line 305 to line 306 that is connected to gates of the switches 313 and 314.

In operation, the actuator 109 moves the recording head 110 based on the current amplitude and current direction. The switches 311-314 control the electrical signal to the actuator, i.e., a pulse width, duration and frequency. The switches 311-314 provide a complimentary switching action. Switches 311 and 314 operate together to complete a conductive circuit. Switches 312 and 313 operate together to complete a conductive circuit. When switch 311 and 314 are "on" (conductive), the current would flow through the actuator in one direction and "push" the actuator 109 in that direction. With the switches 311 and 314 in the on state, the switches 312, 313 are in the off state. When switch 312 and 313 are "on" (conductive), the current would flow through the actuator in the other direction and "pull" the actuator 109 in the pull direction. With the switches 312 and 313 in the "on" state, the switches 311, 314 are in the off state. Operation of the switch pairs 311, 314 and 312, 313 results in complete control of the actuator motion by applying a push/pull signal at the nodes 315, 317. The state of switches 311-314 are controlled by the comparator 307 and pulse controller 301, which can be part of the servo system control governing the motion of the actuator 109. The calculus of the relation between the linear control law from the controller 301 that results in a positive and negative pulses generated by the comparator 307 creating the push signal and the pull signal to the actuator.

Figure 4:
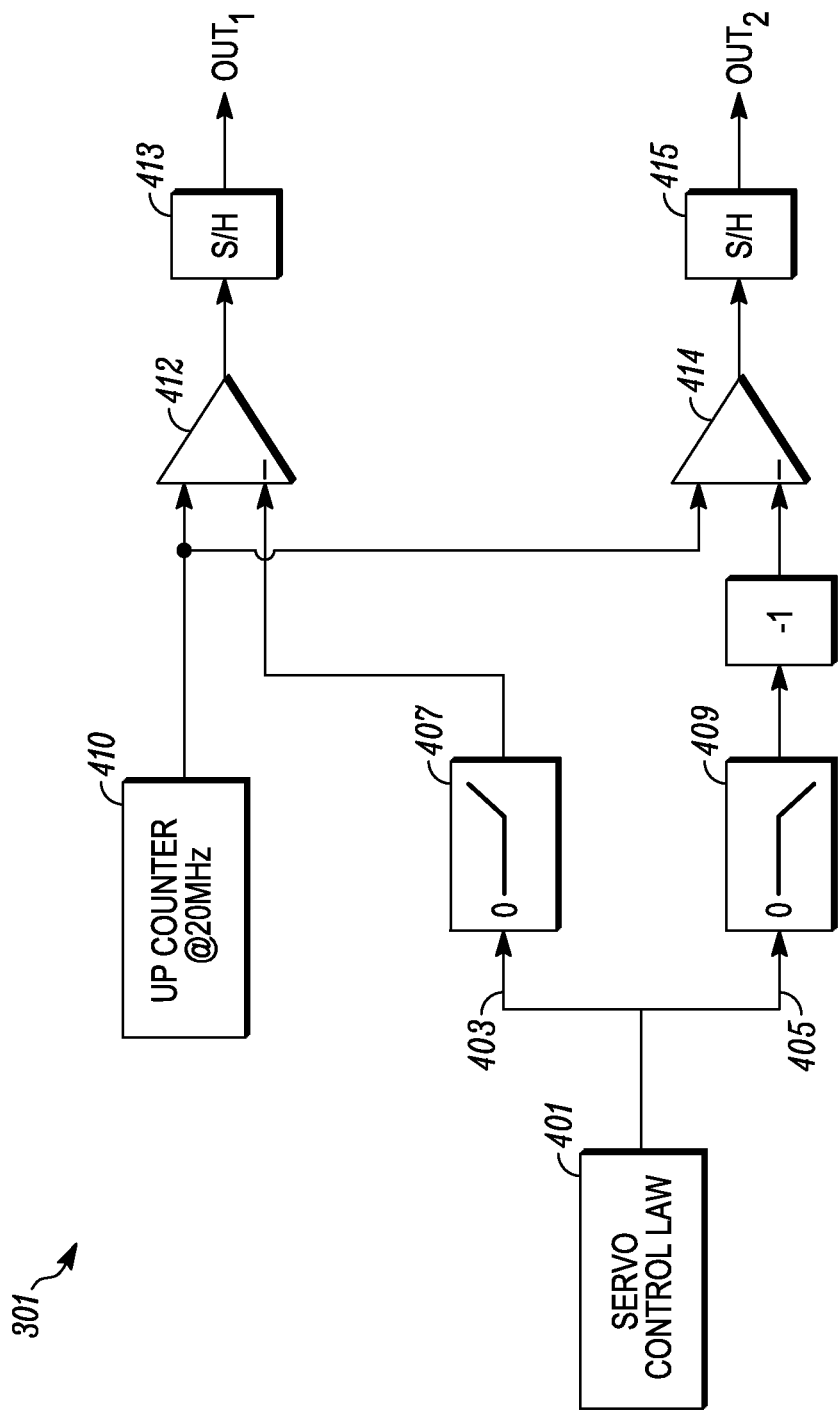
FIG. 4 shows a diagram of a pulse control block for the recording head unit according to an example.

FIG. 4 shows an embodiment of the pulse controller 301. A servo control law module 401 includes memory to store instructions that implement the desired control law for the actuator 109. The servo control law module 401 can also include analog or discrete signal processing components or circuitry. The module 401 outputs a signal that is separated in to two paths 403, 405. The limiters 407, 409 receive signals from paths 403, 405, respectively. The limiters 407, 409 operate to limit the amplitude signal through each path only to the polarity associated with that path. A resettable ramp generator 410 outputs a signal to be compared to the signals at paths 403, 405 after the limiters 407, 409. The resettable ramp generator 410 can be an up counter that operates at a set frequency, e.g., 20 MHz, that resets at 200 KHz. A comparator 412 compares a signal from the limiter 407 and the counter 410 to a sample and hold 413 that outputs a signal to the compactor 307. A comparator 414 compares a signal from the limiter 409 and the counter 410 to a sample and hold 414 that outputs a signal to the comparator 307. In operation signals at each path 403, 405 are compared to the output of the resettable ramp generator 410 to produce a push or pull pulses from sample and holds 413, 415 with width and polarity proportional to that of the control law from module 401. In an example, the width of the "on" control signals produced from implementation of the control law are based on counter values below the value of the control line or curve shown on FIG. 5. The "on" signal to the switches has a width that corresponds to a time the counter is less than or equal to a set value. In an example, if the counter is set to count at 200 KHz by single increments, a counter value of 100 would result in a 50% duty cycle.

Figures 5, 6:
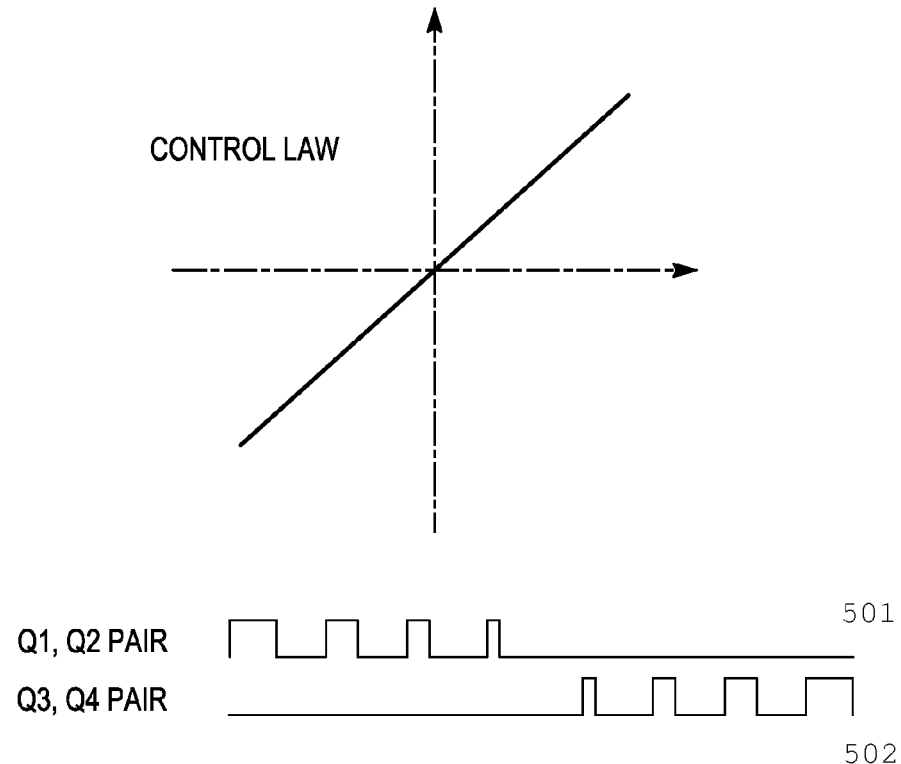
FIG. 5 shows a diagram of a control scheme for a recording head unit according to an example.
FIG. 6 shows a table of signal states for a recording head unit according to an example.

FIG. 5 shows a diagram of a control scheme 500 for a recording head unit 102 according to an example. The push/pull action of the actuator for the recording head is represented as a straight line control scheme. That is, the movement of the actuator is represented on the x-axis and the signal power is represented on the y-axis. The linear control law results in the signals 501, 502 through the corresponding first switch pair 311, 314 and the second switch pair 312, 313, respectively. As shown the greater the needed movement of the actuator, the wider the pulse of the signal by the switch pair, e.g., the conductive portion of the bridge.

FIG. 6 shows a truth table of the signal values at the input to comparator 304 (Out1, Out2) and the state of the switches 311-314 that result in actuator 109 motion. For example, to push the actuator in a first direction, Out1 is high; Out 2 is low; switches 311, 314 are conducting; and switches 312, 313 are open. To pull the actuator in a second direction, Out1 is low; Out 2 is high; switches 311, 314 are open (non-conducting) conducting; and switches 312, 313 are conducting. To idle the actuator, Out1 and Out 2 are low; switches 311, 313 are open (non-conducting); and switches 312, 314 are conducting.

Figure 7:
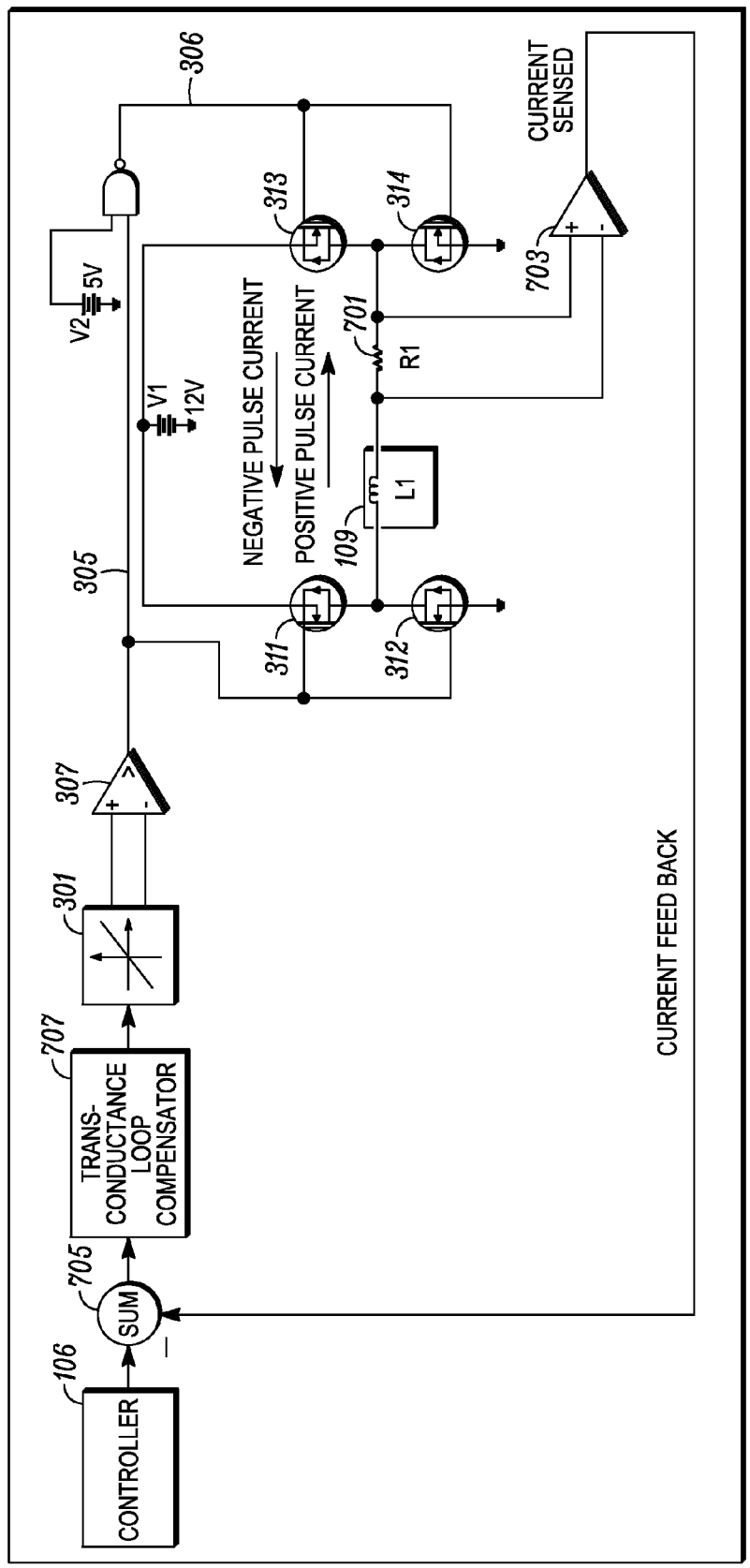
FIG. 7 shows a schematic diagram of portions of an optical tape system using a recording head unit according to an example.

FIG. 7 shows a recording head unit 102 and a system for controlling the recoding head unit according to an example and is similar to the FIG. 3 with a feedback loop. The FIG. 7 embodiment implements a "Trans-Conductance" (Current to Voltage) feedback control system. A sense resistor 701 is positioned between the drain connection of the switches 312, 313 and the second end of the actuator 109. An op amp 703 receives signals from each end of the sense resistor 701 and outputs a signal to a summing circuit 705. The summing circuit 705 also receives a signal from the controller 106 and outputs a summed signal to a forward compensation module 707. The compensation module 707 outputs a control signal to the pulse control module 301. The compensation module 707 can include circuitry to execute instructions to process a signal and memory to store the instructions. The compensation module 707 can be an integrator lead, e.g., implementing (K*(St+1)/S). The compensation module 707 can operate to suppress a dc offset of the final feedback loop due to component inaccuracies. In operation, the signal from the amplifier 703 is a low passed filter representation of the current in the actuator 109 and by the action of closed feedback loop, it enforces the current through the actuator and at the resistor to be identical, to that of the current demand from the controller.

Using the above structures, various benefits are achieved. The switches can be MOSFET transistors that can be operating in switching mode (D Class mode). This results in the power dissipation in the H-Bridge is extremely minimized compare to the prior art linear driver actuator operation. The pulsed transition of the actuator control signal also minimizes the power dissipation of the actuator itself compared to conventional pulse width modulation technique. Using the FIG. 7 feedback embodiment, the controller can more accurately correct for component variance and temperature variance of the device.

Amplifiers, e.g., Linear Power Amplifiers (LPA) have been used for driving voice coil actuators of recording heads utilized in mass storage devices, such as magnetic and optical disk and tape drives. These storage devices use power amplifiers as part of their servo subsystems to control the motion of the actuators that place the recording heads over the desired tracks on the recording media. Excessive power dissipation and large footprints, i.e., required area on circuit board, of components of these amplifiers make them quite unfeasible for next generation mass storage systems, such as optical tape drives. This may due to need for many pickup units, e.g., greater than twelve or twenty-four or greater pickup units, each of which have multiple actuators. As discovered by the present inventor, there is a need for new low cost and low power dissipating design for these drivers of actuators and pickup unit systems. The present disclosure describes a new actuator driver with a power amplifier design to alleviate problems associated with prior art linear drivers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recording head unit comprising:
   a recording head to interact with a storage media;
   an actuator connected to the recording head and configured to move the recording head relative to the storage media; and
   control circuitry to send a control signal to the actuator, wherein the control circuitry includes a pulse driven H-bridge amplifier to control current flow to the actuator,
   wherein the control circuitry includes a sense resistor that provides first sense signal to an amplifier, the amplifier outputs a second sense signal to a summing circuit that sums the second sense signal and an input from a controller and outputs a signal to a forward compensation module outputs a signal to a pulse control module.

2. The recording head unit of claim 1, wherein the control circuitry includes a first switch and a second switch connected in series to create a first node, a third switch and a fourth switch connected in series to create a second node, and wherein the actuator is electrically connected between the first and second nodes.

3. The recording head unit of claim 2, wherein the second switch is connected to ground, the fourth switch is connected to ground, and the first switch and the third switch are connected to a power source.

4. The recording head unit of claim 3, wherein the control circuitry further includes a pulsed control module to supply the control signal to the first switch, the second switch, the third switch and the fourth switch with the first and fourth switches being conductive to send current to the actuator in a first direction to move the head in a first head direction, and the third and second switches being conductive to send current to the actuator in a second direction to move the head in a second head direction.

5. The recording head unit of claim 4, wherein the first switch, the second switch, the third switch and the fourth switch all operate in class D mode to minimize power loss.

6. The recording head unit of claim 5, wherein the first switch, the second switch, the third switch and the fourth switch are MOSFETS.

7. The recording head unit of claim 5, wherein the control circuitry controls outputs a pulsed signal with variable frequency and variable pulse width to the actuator.

8. The recording head unit of claim 5, wherein the control circuitry includes a feedback loop to an input of the controller signal.

9. A recording head unit comprising:
   a recording head to interact with a storage media;
   an actuator connected to the recording head and configured to move the recording head relative to the storage media; and
   control circuitry to send a control signal to the actuator, wherein the control circuitry includes a pulse driven switching circuitry to control current flow to the actuator;
   wherein the control circuitry includes a feedback loop to an input of the controller signal; and
   wherein the control circuitry includes a sense resistor that provides first sense signal to an amplifier, the amplifier outputs a second sense signal to a summing circuit that sums the second sense signal and an input from a controller and outputs a signal to a forward compensation module that outputs a signal to a pulse control module.

10. The recording head unit of claim 9, wherein the control circuitry includes a first switch and a second switch connected in series to create a first node, a third switch and a fourth switch connected in series to create a second node, and wherein the actuator is electrically connected between the first and second nodes.

11. The recording head unit of claim 10, wherein the second switch is connected to ground, the fourth switch is connected to ground, and the first switch and the third switch are connected to a power source.

12. The recording head unit of claim 11, wherein the control circuitry further includes a pulsed control module to supply the control signal to the first switch, the second switch, the third switch and the fourth switch, with the first and fourth switches are conductive to send current to the actuator in a first direction to move the head in a first head direction and the third and second switches are conductive to send current to the actuator in a second direction to move the head in a second head direction.

13. The recording head unit of claim 9, wherein the first switch, the second switch, the third switch and the fourth switch are MOSFETS.

14. The recording head unit of claim 9, wherein the control circuitry controls outputs a pulsed signal with variable frequency and variable pulse width to the actuator.

15. A recording head unit comprising:
   a recording head configured to interact with a storage media;
   an actuator connected to the recording head and configured to move the recording head relative to the storage media; and
   control circuitry to send a control signal to the actuator, wherein the control circuitry includes a pulse-driven bridge amplifier to control current flow to the actuator, wherein the control circuitry outputs a pulsed signal with both variable frequency and variable pulse width to control the actuator;
   wherein the control circuitry includes:
      a sense resistor adjacent the actuator to produce a sense signal that is feedback to a sum circuit to sum the sense signal with an input signal, wherein the sum circuit outputs a sum signal,
      a forward compensation circuit to receive the sum signal, to apply a compensation rule and to output a compensated signal, and
      a pulse control module configured to receive the compensated signal and to output the pulsed signal to control the actuator.

16. The recording head unit of claim 15, wherein the control circuitry further includes a pulsed control module to supply the control signal to the first switch, the second switch, the third switch and the fourth switch, with the first and fourth switches are conductive to send current to the actuator in a first direction to move the head in a first head direction and the third and second switches are conductive to send current to the actuator in a second direction to move the head in a second head direction.

17. The recording head unit of claim 15, wherein the control circuitry includes a trans-conductance feedback control circuitry.

18. The recording head unit of claim 1, wherein the actuator is driven by a pulsed signal with variable frequency and variable pulse width.

* * * * *